US008743967B2

(12) United States Patent
Laksono et al.

(10) Patent No.: US 8,743,967 B2
(45) Date of Patent: Jun. 3, 2014

(54) MULTI-FORMAT VIDEO DECODER WITH VECTOR PROCESSING INSTRUCTIONS AND METHODS FOR USE THEREWITH

(75) Inventors: Indra Laksono, Richmond Hill (CA); Kai Yang, Richmond Hill (CA); Hongri Wang, Richmond Hill (CA); Dong Liu, Markham (CA); Xu Gang (Wilf) Zhao, Maple (CA); Eric Young, Markham (CA); Edward Hong, North York (CA)

(73) Assignee: ViXS Systems, Inc., Toronto, Ontario (CA)

( * ) Notice: Subject to any disclaimer, the term of this patent is extended or adjusted under 35 U.S.C. 154(b) by 368 days.

(21) Appl. No.: 13/076,554

(22) Filed: Mar. 31, 2011

(65) Prior Publication Data
US 2012/0230426 A1 Sep. 13, 2012

Related U.S. Application Data

(60) Provisional application No. 61/450,859, filed on Mar. 9, 2011.

(51) Int. Cl.
*H04N 7/12* (2006.01)
*H04N 7/50* (2006.01)
(52) U.S. Cl.
CPC ...................................... *H04N 7/50* (2013.01)
USPC ..................................................... 375/240.25
(58) Field of Classification Search
CPC ....................................................... H04N 7/055
USPC ........................................................ 375/240
See application file for complete search history.

(56) References Cited

U.S. PATENT DOCUMENTS

| 6,909,744 | B2 | 6/2005 | Molloy | |
|---|---|---|---|---|
| 7,724,826 | B2 * | 5/2010 | Bober | 375/240.22 |
| 8,284,844 | B2 * | 10/2012 | MacInnis et al. | 375/240.25 |
| 8,290,056 | B2 * | 10/2012 | Stein et al. | 375/240.18 |
| 2003/0185306 | A1 * | 10/2003 | MacInnis et al. | 375/240.25 |
| 2007/0133692 | A1 | 6/2007 | Reddy | |
| 2010/0290530 | A1 * | 11/2010 | Huang et al. | 375/240.16 |
| 2011/0080954 | A1 * | 4/2011 | Bossen et al. | 375/240.16 |
| 2012/0163470 | A1 * | 6/2012 | Wu et al. | 375/240.23 |
| 2012/0300840 | A1 * | 11/2012 | Ueda | 375/240.12 |

FOREIGN PATENT DOCUMENTS

EP 1351512 A2 8/2003

OTHER PUBLICATIONS

European Search Report; 12158657.2-1247; May 22, 2012; 8 pages.
Bailey, et al.; Programmable Vision Processor/Controller for Flexible Implementation of Current and Future Image Compression Standards; IEEE Micro; Oct. 1992; vol. 12, Iss 5; pp. 33-39.
Probell; Architecture Considerations for Multi-Format Programmable Video Processors; Journal of Signal Processing Systems; vol. 50, Issue 1; Jan. 2008; pp. 33-39.

* cited by examiner

*Primary Examiner* — Joseph Ustaris
*Assistant Examiner* — Talha Nawaz
(74) *Attorney, Agent, or Firm* — Garlick & Markison; Bruce E. Stuckman

(57) ABSTRACT

A video decoder includes an entropy decoding device that generates entropy decoded (EDC) data from an encoded video signal. A multi-format video decoding device includes a plurality of vector processor units that generate a decoded video signal from the EDC data. The plurality of vector processing units are programmed via VPU instructions formatted to include a vector instruction portion, a scalar instruction portion, and a branching instruction portion.

12 Claims, 10 Drawing Sheets

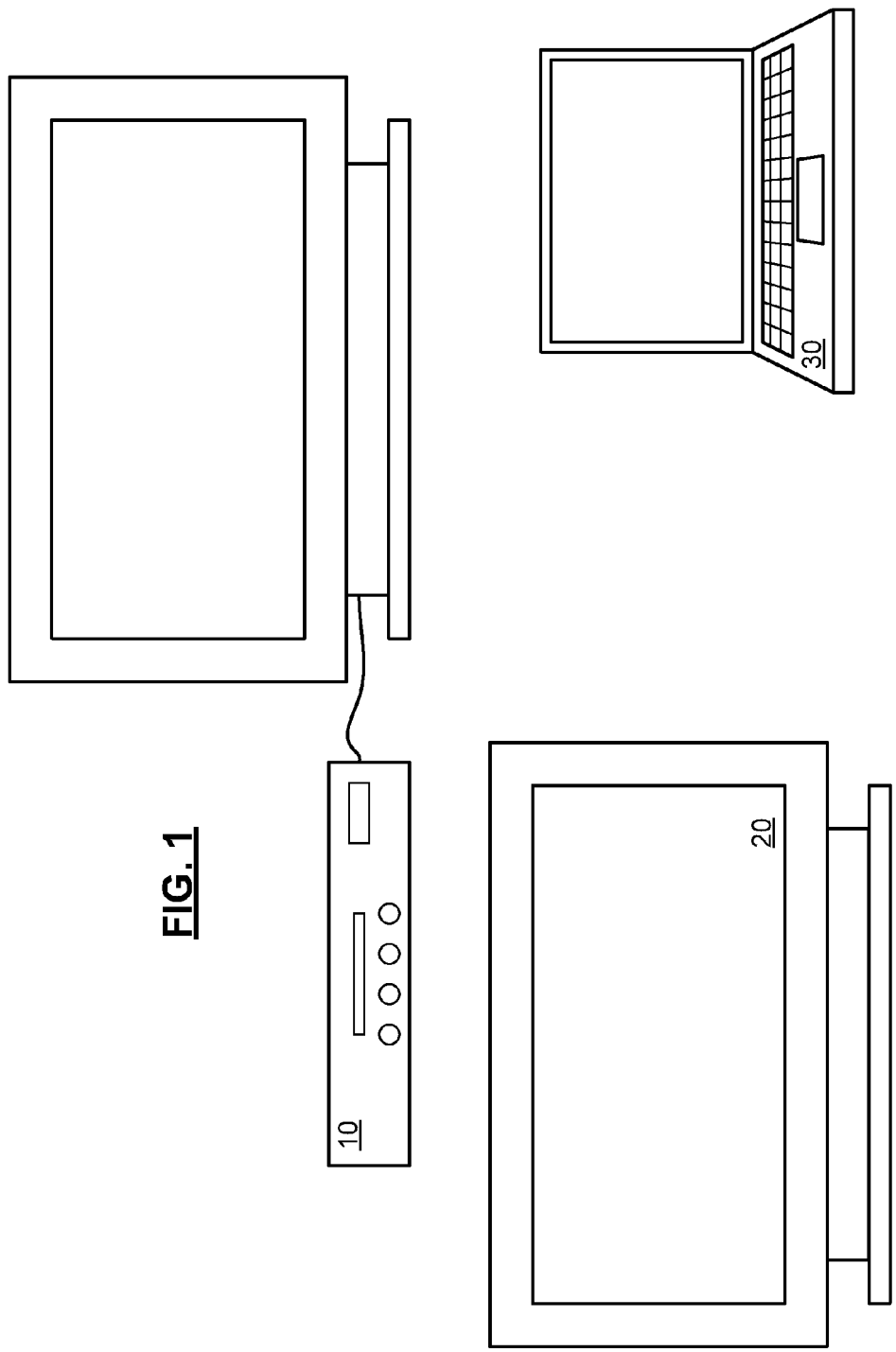

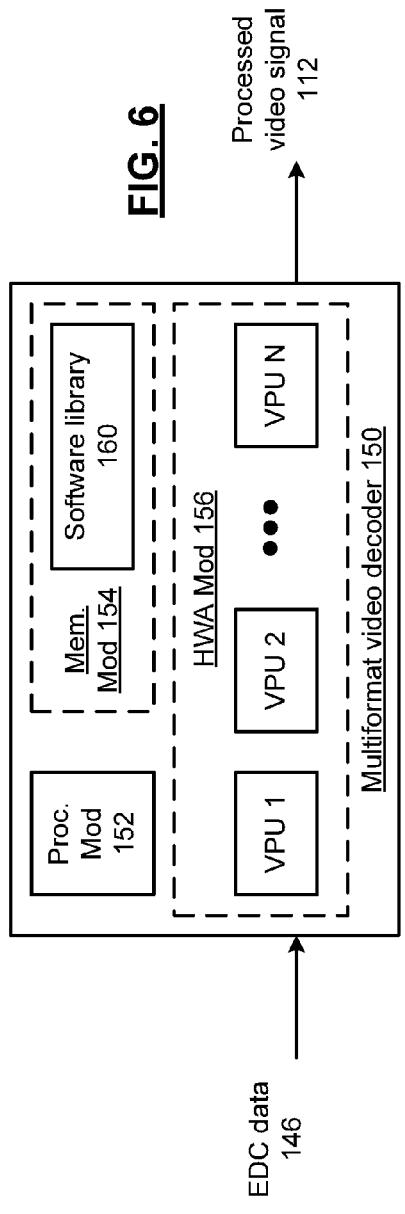
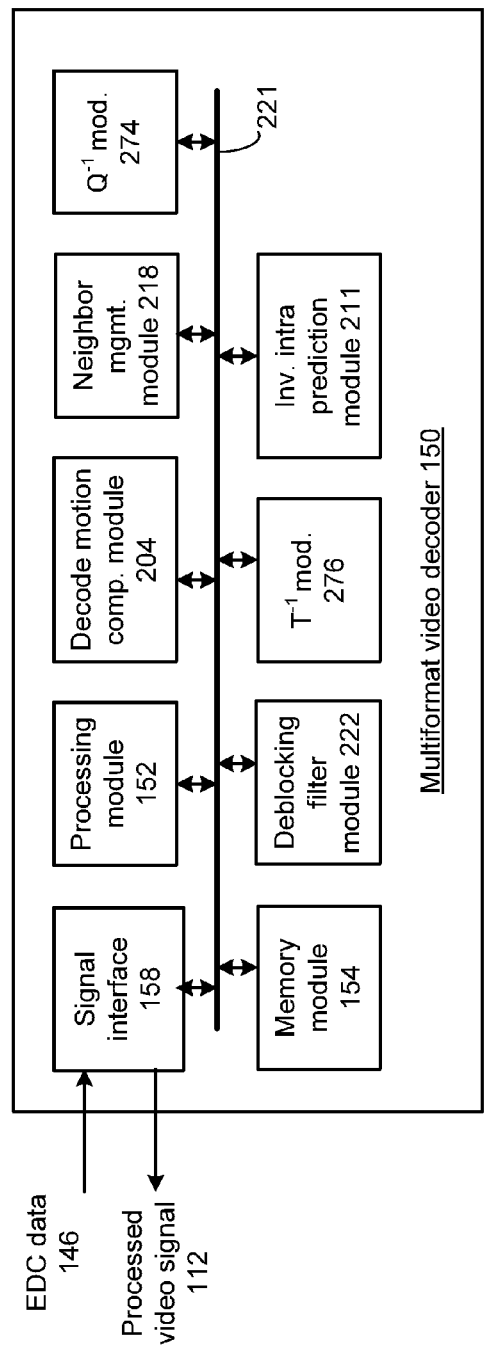

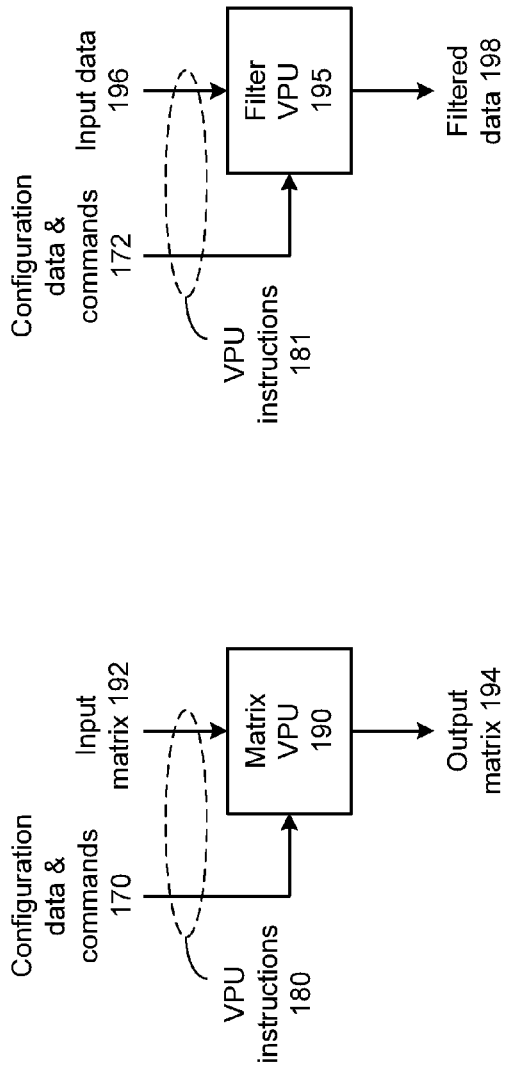

MULTI-FORMAT VIDEO DECODER WITH VECTOR PROCESSING INSTRUCTIONS AND METHODS FOR USE THEREWITH

CROSS-REFERENCE TO RELATED PATENTS

The present application claims priority under 35 USC 119 (e) to the provisionally filed application entitled, "MULTI-FORMAT VIDEO DECODER AND METHODS FOR USE THEREWITH," having Ser. No. 61/450,859, filed on Mar. 9, 2011, the contents of which are incorporated herein by reference thereto.

TECHNICAL FIELD OF THE INVENTION

The present invention relates to coding used in devices such as video encoders/decoders for stereoscopic television signals.

DESCRIPTION OF RELATED ART

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC) and the VP8 standard set forth by On2 Technologies, Inc. While these standards set forth many powerful techniques, further improvements are possible to improve the performance and speed of implementation of such methods. The video signal encoded by these encoding methods must be similarly decoded for playback on most video display devices.

The Motion Picture Expert Group (MPEG) has presented a Scalable Video Coding (SVC) Annex G extension to H.264/MPEG-4 AVC for standardization. SVC provides for encoding of video bitstreams that include subset bitstreams that can represent lower spatial resolution, lower temporal resolution or otherwise lower quality video. A subset bitstream can be derived by dropping packets from the total bitstream. SVC streams allow end devices to flexibly scale the temporal resolution, spatial resolution or video fidelity, for example, to match the capabilities of a particular device.

Efficient and fast encoding and decoding of video signals is important to the implementation of many video devices, particularly video devices that are destined for home use. Further limitations and disadvantages of conventional and traditional approaches will become apparent to one of ordinary skill in the art through comparison of such systems with the present invention.

BRIEF DESCRIPTION OF THE SEVERAL VIEWS OF THE DRAWINGS

FIGS. 1-3 present pictorial diagram representations of various video devices in accordance with embodiments of the present invention.

FIG. 6 presents a block diagram representation of a multi-format video decoder 150 in accordance with an embodiment of the present invention.

FIG. 7 presents a block diagram representation of a multi-format video decoder 150 in accordance with an embodiment of the present invention.

FIG. 9 presents a block diagram representation of a matrix vector processing unit 190 in accordance with another embodiment of the present invention.

FIG. 10 presents a block diagram representation of a filter vector processing unit in accordance with another embodiment of the present invention.

FIG. 11 presents a block diagram representation of a VPU instruction 180 in accordance with another embodiment of the present invention.

DETAILED DESCRIPTION OF THE INVENTION INCLUDING THE PRESENTLY PREFERRED EMBODIMENTS

FIGS. 1-3 present pictorial diagram representations of various video devices in accordance with embodiments of the present invention. In particular, set top box 10 with built-in digital video recorder functionality or a stand alone digital video recorder, television or monitor 20 and portable computer 30 illustrate electronic devices that incorporate a video decoder in accordance with one or more features or functions of the present invention. While these particular devices are illustrated, the present invention can be implemented in any device that is capable of decoding and/or transcoding video content in accordance with the methods and systems described in conjunction with FIGS. 4-17 and the appended claims.

Figure 4:
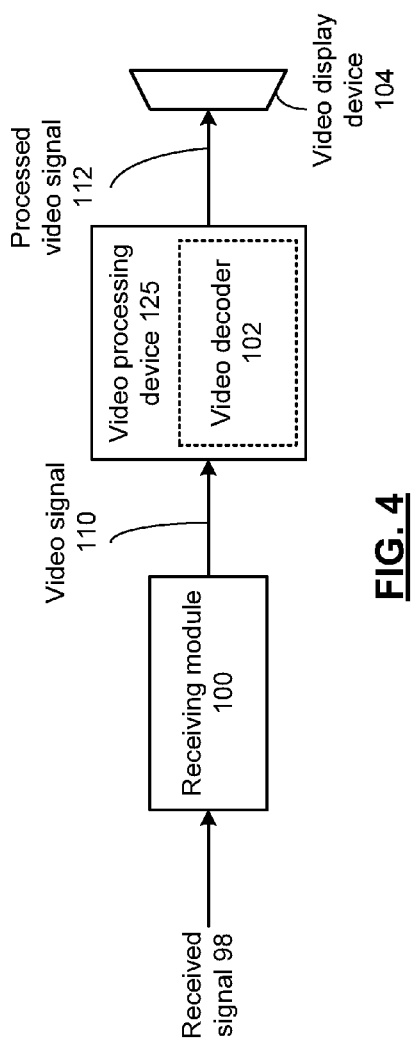
FIG. 4 presents a block diagram representation of a video system in accordance with an embodiment of the present invention.

FIG. 4 presents a block diagram representation of a video decoder 102 in accordance with an embodiment of the present invention. In particular, this video device includes a receiving module 100, such as a server, cable head end, television receiver, cable television receiver, satellite broadcast receiver, broadband modem, 3G transceiver or other information receiver or transceiver that is capable of receiving a received signal 98 and generating a video signal 110 that has been encoded via a video encoding format. Video processing device 125 includes video decoder 102 and is coupled to the receiving module 100 to decode or transcode the video signal for storage, editing, and/or playback in a format corresponding to video display device 104. Video processing device can include set top box 10 with built-in digital video recorder functionality or a stand alone digital video recorder. While shown as separate from video display device 104, video processing device 125, including video decoder 102 can be incorporated in television or monitor 20 and portable computer 30 of other device that includes a video decoder, such as video decoder 102.

In an embodiment of the present invention, the received signal 98 is a broadcast video signal, such as a television signal, high definition television signal, enhanced definition television signal or other broadcast video signal that has been transmitted over a wireless medium, either directly or through one or more satellites or other relay stations or through a cable network, optical network or other transmission network. In addition, received signal 98 can be generated from a stored video file, played back from a recording medium such as a magnetic tape, magnetic disk or optical disk, and can include a streaming video signal that is transmitted over a public or private network such as a local area network, wide area network, metropolitan area network or the Internet.

Video signal 110 can include a digital video signal complying with a digital video codec standard such as H.264, MPEG-4 Part 10 Advanced Video Coding (AVC) including a SVC signal, an encoded stereoscopic video signal having a base layer that includes a 2D compatible base layer and an enhancement layer generated by processing in accordance with an MVC extension of MPEG-4 AVC, or another digital format such as a Motion Picture Experts Group (MPEG) format (such as MPEG1, MPEG2 or MPEG4), Quicktime format, Real Media format, Windows Media Video (WMV) or Audio Video Interleave (AVI), video coding one (VC-1), VP8, etc.

Video display devices 104 can include a television, monitor, computer, handheld device or other video display device that creates an optical image stream either directly or indirectly, such as by projection, based on the processed video signal 112 either as a streaming video signal or by playback of a stored digital video file.

Figure 5:
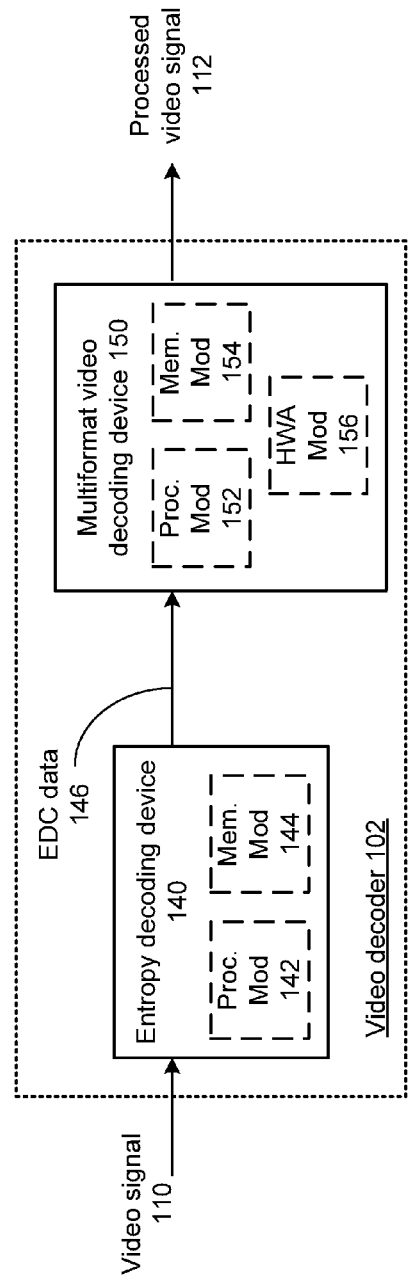
FIG. 5 presents a block diagram representation of a video decoder 102 in accordance with an embodiment of the present invention.

FIG. 5 presents a block diagram representation of a video decoder 102 in accordance with an embodiment of the present invention. Video decoder 102 includes an entropy decoding device 140 having a processing module 142 that generates entropy decoded (EDC) data 146 from an encoded video signal such as video signal 110. The EDC data 146 can include run level data, motion vector differential data, and macroblock header data and/or other data that results from the entropy decoding of an encoded video signal. Multi-format video decoding device 150 includes a processing module 152, a memory module 154 and a hardware accelerator module 156 that operate to generate a decoded video signal, such as processed video signal 112, from the EDC data 146.

In an embodiment of the present invention, the entropy decoding device 140 and the multi-format video decoding device 150 operate contemporaneously in a pipelined process where the multi-format video decoding device 150 generates a first portion of the decoded video signal during at least a portion of time that the entropy decoding device 140 generates EDC data 146 from a second portion of the encoded video signal.

The processing modules 142 and 152 can each be implemented using a single processing device or a plurality of processing devices. Such a processing device may be a microprocessor, co-processors, a micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory modules 144 and 154. These memories may each be a single memory device or a plurality of memory devices. Such a memory device can include a hard disk drive or other disk drive, read-only memory, random access memory, volatile memory, non-volatile memory, static memory, dynamic memory, flash memory, cache memory, and/or any device that stores digital information. Note that when the processing modules 142 and 152 implement one or more of their functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. In an embodiment of the present invention the processing modules 142 and 152 each includes a processor produced by ARC International to implement the neighbor management module 218, however other processor configurations could likewise be employed.

FIG. 6 presents a block diagram representation of a multi-format video decoder 150 in accordance with an embodiment of the present invention. The memory module 154 includes a software library 160 that stores format configuration data corresponding to a plurality of video coding formats such as such as H.264, MPEG-4 Part 10 Advanced Video Coding (AVC) including the SVC and MVC extensions of MPEG-4 AVC, MPEG2, MPEG4, Quicktime format, Real Media format, Windows Media Video (WMV) or Audio Video Interleave (AVI), video coding one (VC-1), VP8, or other video coding/compression format, etc. The hardware accelerator module 156 includes a plurality of vector processor units (VPU 1, VPU 2, ... VPU N) that operate in conjunction with processing module 152 to generating a decoded video signal from the EDC data 146. The plurality of vector processing units and the processing module 152 are configured, based on the configuration data, to a selected one of the plurality of video coding formats. In this fashion, a since video decoder 102 can be configured for operation of the particular video coding format or formats of the video signal 110.

In an embodiment of the present invention, the multi-format video decoder 150 can receive selection data from a user or designer that indicates the particular video coding format. In another embodiment of the present invention, EDC data 146 can be analyzed by processing module 152 to identify the video coding format of the video signal 110. In either case, the multi-format video decoder 150 responds to the selection by retrieving the configuration data from the software library 160 and by configuring the processing module 152 and the vector processing units to decode the selected video coding format.

Configuration data can include loading program instructions executed by the processing module 152 and the vector processing units of the hardware accelerator module 156 along with other data used in conjunction with the decoding of the EDC data 146. For example, when a particular video coding format is selected, software for processing module 152 and VPU instructions for the hardware accelerator module 156 are selected to be executed. In one mode of operation, the VPU instructions include one or more instructions that configure the vector processing units of hardware accelerator module 156 to the selected coding format, in addition to instructions that perform the particular decoding operations performed by the vector processing units in accordance with the selected video coding format.

As will be discussed further in conjunction with FIGS. 7-12, the vector processors can include one or more matrix vector processors that perform parallel matrix operations such as matrix addition, multiplication, transposition, inversion and/or other matrix operation. The vector processors can further include one or more filter vector processors that perform parallel filter operations. These vector processing units are configured via VPU programming instructions that include vector instructions, scalar instructions and branching instructions, to operate in accordance with the selected video coding format.

FIG. 7 presents a block diagram representation of a multi-format video decoder 150 in accordance with an embodiment of the present invention. In particular, multi-format video decoder 150 includes a processing module 152 and a memory module 154 as described in conjunction with FIG. 5. In addition, the multi-format video decoding device 150 further includes a bus 221, a signal interface 158, decode motion compensation module 204, neighbor management module 218, deblocking filter module 222, inverse transform module 276, inverse quantization module 274, and inverse intra prediction module 211. While a particular bus architecture is shown that represents the functionally of communication between the various modules of multi-format video decoding device 150, other architectures can be implemented in accordance with the broad scope of the present invention.

In operation, the signal interface 158 receives EDC data 146 and optionally buffers and preprocesses the EDC data 146 for processing by the other modules of multi-format video decoding device 150. Similarly, the decoded video signal generated via processing by the other modules of multi-format video decoding device 150 is optionally buffered, such as via a ring buffer or other buffer structure implemented in conjunction with memory locations of memory module 154 and formatted for output as processed video signal 112.

The decode motion compensation module 204, neighbor management module 218, deblocking filter module 222, inverse transform module 276, inverse quantization module 274, and inverse intra prediction module 211 are configured to operate to decode the EDC data 146 in accordance with the selected video format such as VP8, H.264 (including MVC and/or SVC), VC-1 or other compression standard. In an embodiment of the present invention, the decode motion compensation module 204, neighbor management module 218, deblocking filter module 222, inverse transform module 276, inverse quantization module 274, inverse intra prediction module 211 are implemented using software stored in memory module 154 and executed via processing module 152 as well as via vector processing unit instructions executed by the plurality of vector processing units of hardware accelerator module 156. In a particular embodiment, the decode motion compensation module 204, deblocking filter module 222, and inverse intra prediction module 211 are implemented using three separate filter vector processing units, one for each module. In addition, the inverse transform module 276 and the inverse quantization module 274 are implemented via two separate matrix vector processing units, one for each module. In an embodiment of the present invention the neighbor management module 218 is implemented via software executed by processing module 152.

In operation, neighbor management module 218 generates motion vector data, macroblock mode data and deblock strength data, based on the motion vector differential data and the macroblock header data. In an embodiment of the present invention, a data structure, such as a linked list, array or one or more registers are used to associate and store neighbor data for each macroblock of a processed picture. In particular, the neighbor management module 218 stores the motion vector data for a group of macroblocks that neighbor a current macroblock and generates the motion vector data for the current macroblock based on both the macroblock mode data and the motion vector data for the group of macroblocks that neighbor the current macroblock. In addition, the neighbor management module 218 calculates a motion vector magnitude and adjusts the deblock strength data based on the motion vector magnitude.

The decode motion compensation module 204 generates inter-prediction data based on the motion vector data when the macroblock mode data indicates an inter-prediction mode. The inverse intra-prediction module 211 generates intra-prediction data when the macroblock mode data indicates an intra-prediction mode. The inverse quantization module 274 dequantizes run level data. The dequantized run level data is inverse transformed, such as via an inverse discrete cosine transform or other inverse transform via inverse transform module 276 to generate residual data. The inverse intra-prediction module 211 generates reconstructed picture data based on the residual data and on the inter-prediction data when the macroblock mode data indicates an inter-prediction mode and based on the residual data and on the intra-prediction data when the macroblock mode data indicates an intra-prediction mode.

The deblocking filter module 222 generates the decoded video signal from the reconstructed picture data, based on the deblock strength data. In operation, the deblocking filter 222 operates to smooth horizontal and vertical edges of a block that may correspond to exterior boundaries of a macroblock of a frame or field of video signal 110 or edges that occur in the interior of a macroblock. A boundary strength, that is determined based on quantization parameters, adjacent macroblock type, etcetera, can vary the amount of filtering to be performed. For example, the H.264 standard defines two parameters, $\alpha$ and $\beta$, that are used to determine the strength of filtering on a particular edge. The parameter $\alpha$ is a boundary edge parameter applied to data that includes macroblock boundaries. The parameter $\beta$ is an interior edge parameter applied to data that within a macroblock interior. In accordance with the present invention, motion vector magnitude is used by neighbor management module 218 to generate deblock strength data that adjusts the values for $\alpha$ and $\beta$ for deblocking filter module 222. For instance, when the motion vector magnitude indicates large motion vectors, e.g. magnitudes above a first magnitude threshold, a larger value of $\alpha$ can be selected. Further, motion vector magnitude indicates small motion vectors, e.g. magnitudes below the same or other threshold, a smaller value of $\alpha$ can be selected.

Figure 8:
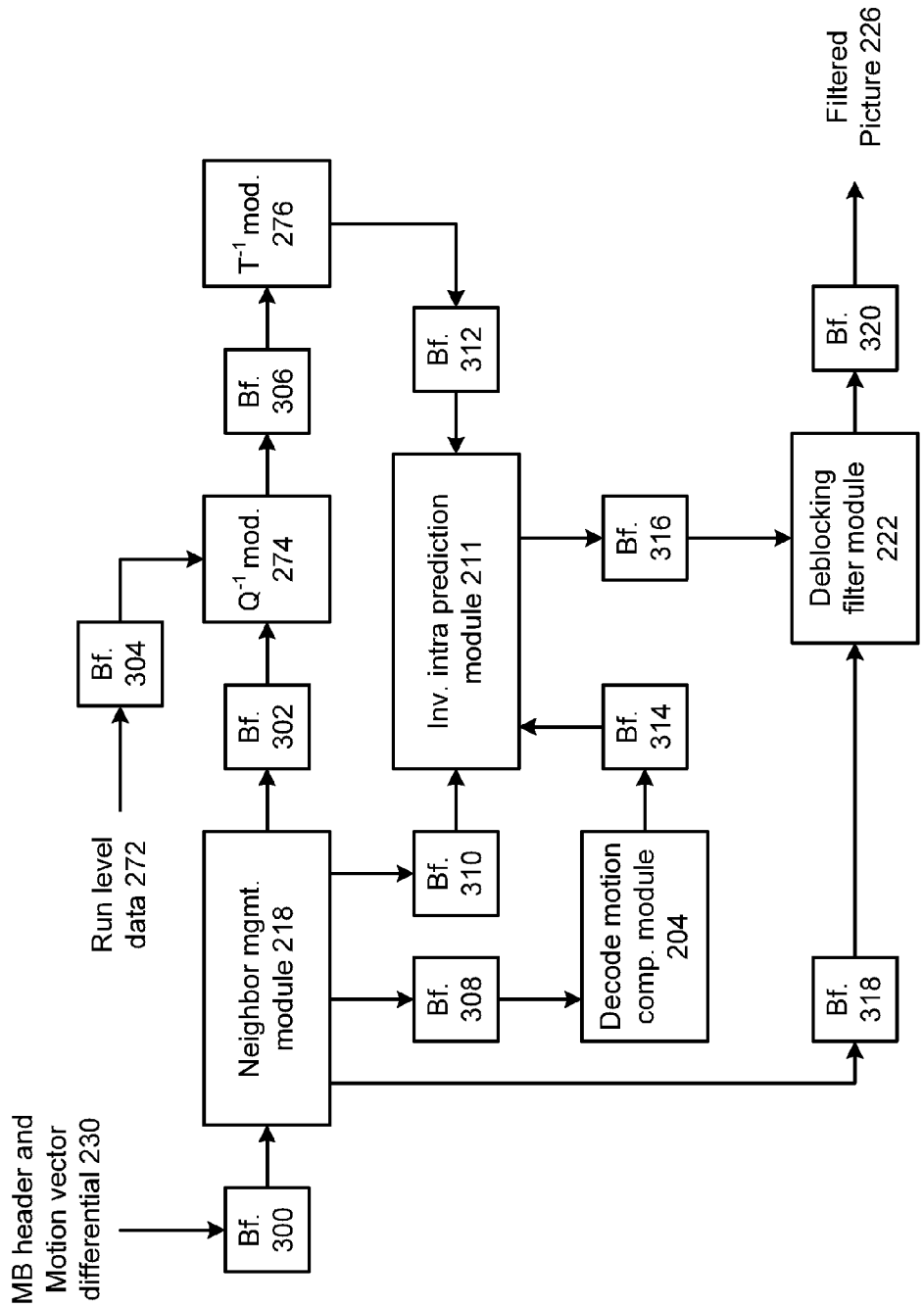
FIG. 8 presents a block diagram representation of a decoding process in accordance with an embodiment of the present invention.

FIG. 8 presents a block diagram representation of a decoding process in accordance with an embodiment of the present invention. In this embodiment, the neighbor management module 218 receives macroblock header and motion vector differential data 230 from the EDC data 146 via buffer 300. The neighbor management module 218 checks the macroblock (MB) mode from the MB header. In inter-prediction mode, the neighbor management module 218 calculates motion vectors and also calculates deblock strength data and passes this data along with other EDC data, such as run level data 272 to one or more frame buffers, represented in the process flow as buffers 302, 304, 308, 310 and 318 implemented via memory module 154. The decode motion compensation module 204 generates inter-prediction data based on the motion vectors and on reference frames retrieved from the frame buffer and stores the results in buffer 314, such as a ring buffer. In intra-prediction mode, the inverse intra prediction module 211 generates intra-prediction data.

The inverse quantization module 274 retrieves run level data 272 from buffer 304 and inverse quantizes the data with data from the frame buffer 302 and generates de-quantized data that is stored in buffer 306. Inverse transforms module 276 inverse transforms the de-quantized data based on the frame buffered data to generate residual data that is stored in buffer 312. The residual data is combined in inverse intra-prediction module 211 with either intra-prediction data or inter-prediction data supplied in response to the mode determination by neighbor management module 218, to generate current reconstructed frames/fields that are buffered in the buffer 316.

Deblocking filter module 222 applies deblocking filtering to the reconstructed frames/fields in accordance with the deblock strength data from neighbor management module 218 to generate decoded video output in the form of filtered pictures 226 that are buffered via buffer 320.

The buffers 306, 312, 314, 316, 318 and 320 can each be a ring buffer implemented via memory module 154, however other buffer configurations are likewise possible.

FIG. 9 presents a block diagram representation of a matrix vector processing unit 190 in accordance with another embodiment of the present invention. In particular, matrix vector processing unit 190 includes a dedicated hardware block that performs parallel matrix operations such as matrix addition, multiplication, transposition, inversion and/or other matrix operation on an input matrix 192 to generate an output matrix 194.

The matrix vector processing unit 190 is configured via VPU instructions 180 that include vector instructions, scalar instructions and branching instructions. These VPU instructions 180 include configuration data and commands 170 that configure the matrix VPU 190 in accordance with the selected video coding format and command the matrix vector processing unit to perform the corresponding functions such as all or part of an inverse discrete cosine transform, inverse quantization or other matrix function of the multi-format video decoder 150. The VPU instructions 180 further include vector and/or scalar data used in conjunction with vector and scalar operations of the device.

FIG. 10 resents a block diagram representation of a filter vector processing unit 195 in accordance with another embodiment of the present invention In particular, filter vector processing unit 195 includes a dedicated hardware block that performs parallel filter operations such as an n-tap one-dimensional horizontal filter, an n-tap one-dimensional vertical filter, or an n-tap two-dimensional filter. The filter VPU 196 operates to filter input data 196, such as a block of pixels, a row of pixels, a column of pixels of a video picture or other data to generate filtered data 198.

The filter vector processing unit 195 is configured via VPU instructions 181 that include vector instructions, scalar instructions and branching instructions. These VPU instructions 181 include configuration data and commands 172 that configure the filter VPU 195 in accordance with the selected video coding format such as by programming the filter parameters, (e.g. the number of taps, type of filter, and the particular filter coefficients) and command the filter vector processing unit to perform the corresponding functions such as all or part of the generation of inter-prediction data, intra-prediction data and or filtered picture data of the multi-function video decoder 150. The VPU instructions 181 further include vector and/or scalar data used in conjunction with vector and scalar operations of the device.

FIG. 11 presents a block diagram representation of a VPU instruction 180 or 181 in accordance with another embodiment of the present invention. As previously discussed, the VPU instructions include three portions, vector instruction 182, scalar instruction 184, and branching instruction 186. Through the use of these instructions, a vector processing unit, such as matrix vector processing unit 190 or filter vector processing unit 195 can be configured/programmed to move blocks of data, to perform vector or scalar operations on the data, to perform conditional or unconditional branching, or to perform other logical or arithmetic operations.

In an embodiment of the present invention, the vector instruction 182 can include commands and data to perform multiple simultaneous logical or arithmetic operations via a single instruction. In an embodiment of the present invention, the vector data can include data blocks of 32 bits or more and the matrix or vector filter operations include any of the operations discussed in conjunction with either matrix VPU 190 or filter VPU 195. The scalar instruction 184 can include commands and data to perform single scalar logical or arithmetic operations via a single instruction. In an embodiment of the present invention, the scalar data can include scalar data blocks of 32 bits or less or long scalar blocks of more than 32 bits. Matrix or filter scalar operations include mask creation, data masking, addressing instructions, data move operations, flag calculations, etc. Branching instructions include conditional or unconditional branching instructions based on logical or arithmetic conditions.

In an example of operation, the filter VPU 195 implements a deblocking filter as part of deblocking filter module 222. In one mode of operation, the filter VPU 195 executes filter VPU instructions 181 in a similar fashion to a function or subroutine call. For example, in an initial VPU instruction 181, the filter VPU 195 can execute a data move command to configure a particular n-tap deblocking filter, based on the selection of the particular video coding format, by loading filter coefficients and other configuration data to establish an initial filter configuration. In subsequent VPU instructions 181, the deblock strength is retrieved to optionally adjust the filter coefficients or otherwise adjust the filter configuration to a current deblock strength. In addition, input data 196 is retrieved, filtered and transferred to a buffer in response to filter commands.

Figure 12:
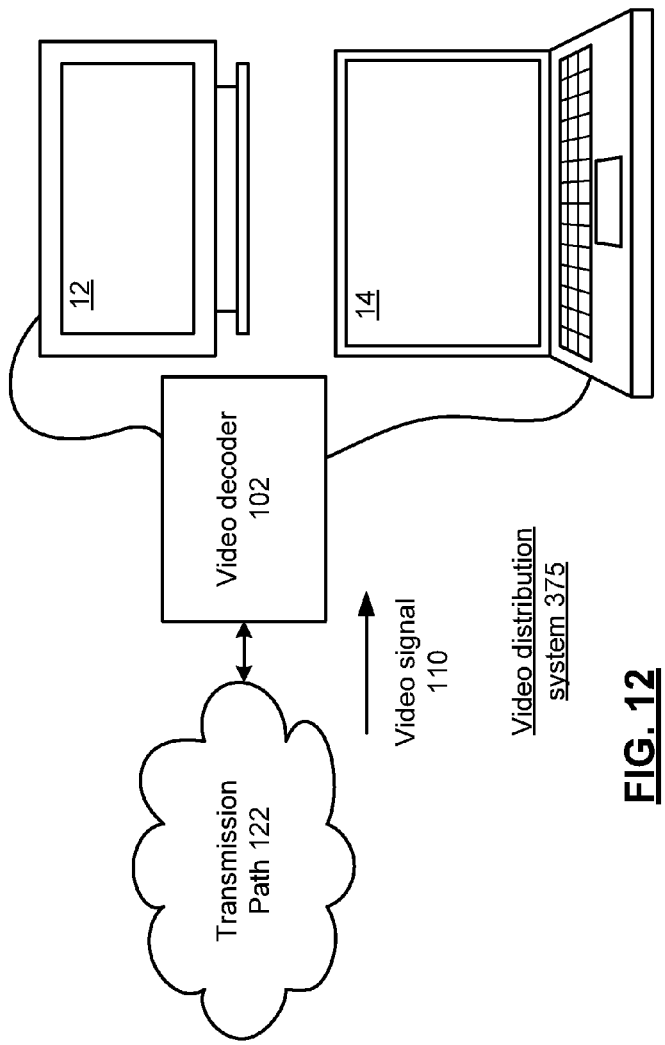
FIG. 12 presents a block diagram representation of a video distribution system 375 in accordance with an embodiment of the present invention.

FIG. 12 presents a block diagram representation of a video distribution system 375 in accordance with an embodiment of the present invention. In particular, video signal 110 is transmitted from a video encoder via a transmission path 122 to a video decoder 102. The video decoder 102 operates to decode the video signal 110 for display on a display devices 12 or 14 or other display device. In an embodiment of the present invention, video decoder 102 can be implemented in a set-top box, digital video recorder, router or home gateway. In the alternative, decoder 102 can optionally be incorporated directly in the display device 12 or 14.

The transmission path 122 can include a wireless path that operates in accordance with a wireless local area network protocol such as an 802.11 protocol, a WIMAX protocol, a Bluetooth protocol, etc. Further, the transmission path can include a wired path that operates in accordance with a wired protocol such as a Universal Serial Bus protocol, an Ethernet protocol or other high speed protocol.

Figure 13:
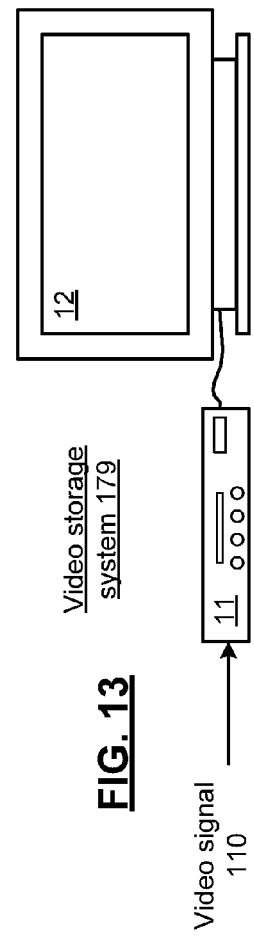
FIG. 13 presents a block diagram representation of a video storage system 179 in accordance with an embodiment of the present invention.

FIG. 13 presents a block diagram representation of a video storage system 179 in accordance with an embodiment of the present invention. In particular, device 11 is a set top box with built-in digital video recorder functionality, a stand alone digital video recorder, a DVD recorder/player or other device that stores the video signal 110. In this configuration, device 11 can include video decoder 102 that operates to decode the video signal 110 when retrieved from storage to generate a processed video signal 112 in a format that is suitable for display by video display device 12 or 14. While these particular devices are illustrated, video storage system 179 can include a hard drive, flash memory device, computer, DVD burner, or any other device that is capable of generating, storing, decoding, transcoding and/or displaying the video content of video signal 110 in accordance with the methods and systems described in conjunction with the features and functions of the present invention as described herein.

Figure 14:
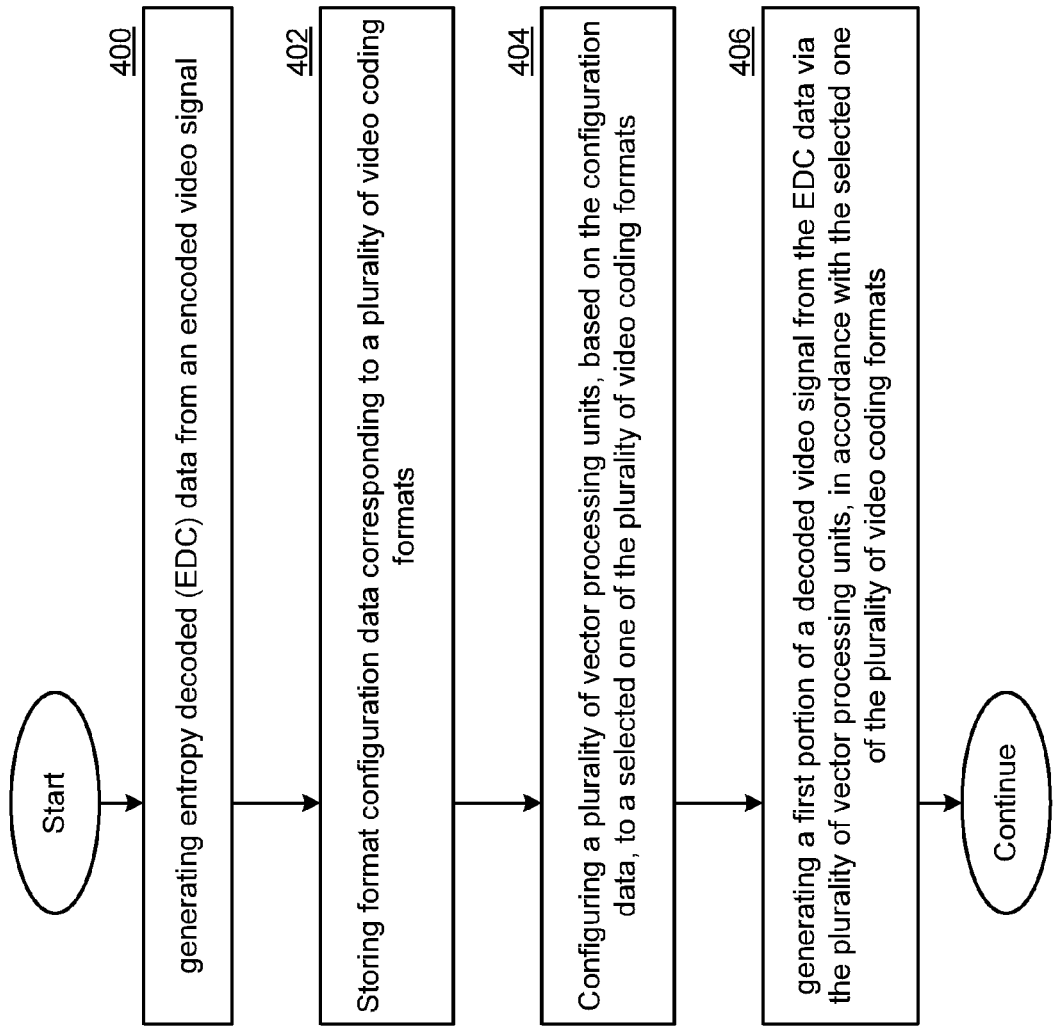
FIG. 14 presents a flow diagram representation of a method in accordance with an embodiment of the present invention.

FIG. 14 presents a block diagram representation of a method in accordance with an embodiment of the present invention. In particular, a method is presented for use in conjunction with one or more functions and features described in conjunction with FIGS. 1-9. In step 400, entropy decoded (EDC) data is generated from an encoded video signal. In step 402, format configuration data, corresponding to a plurality of video coding formats, is stored. In step 404, a plurality of vector processor units are configured, based on the configuration data, to a selected one of the plurality of video coding formats. In step 406, a decoded video signal is generated from the EDC data, via the plurality of vector processing units, in accordance with the selected one of the plurality of video coding formats.

In an embodiment of the present invention, step 404 includes configuring at least one or more matrix vector processors to parallel process at least one matrix operation and/or configuring one or more filter vector processors to parallel process at least one filter operation.

Figure 15:
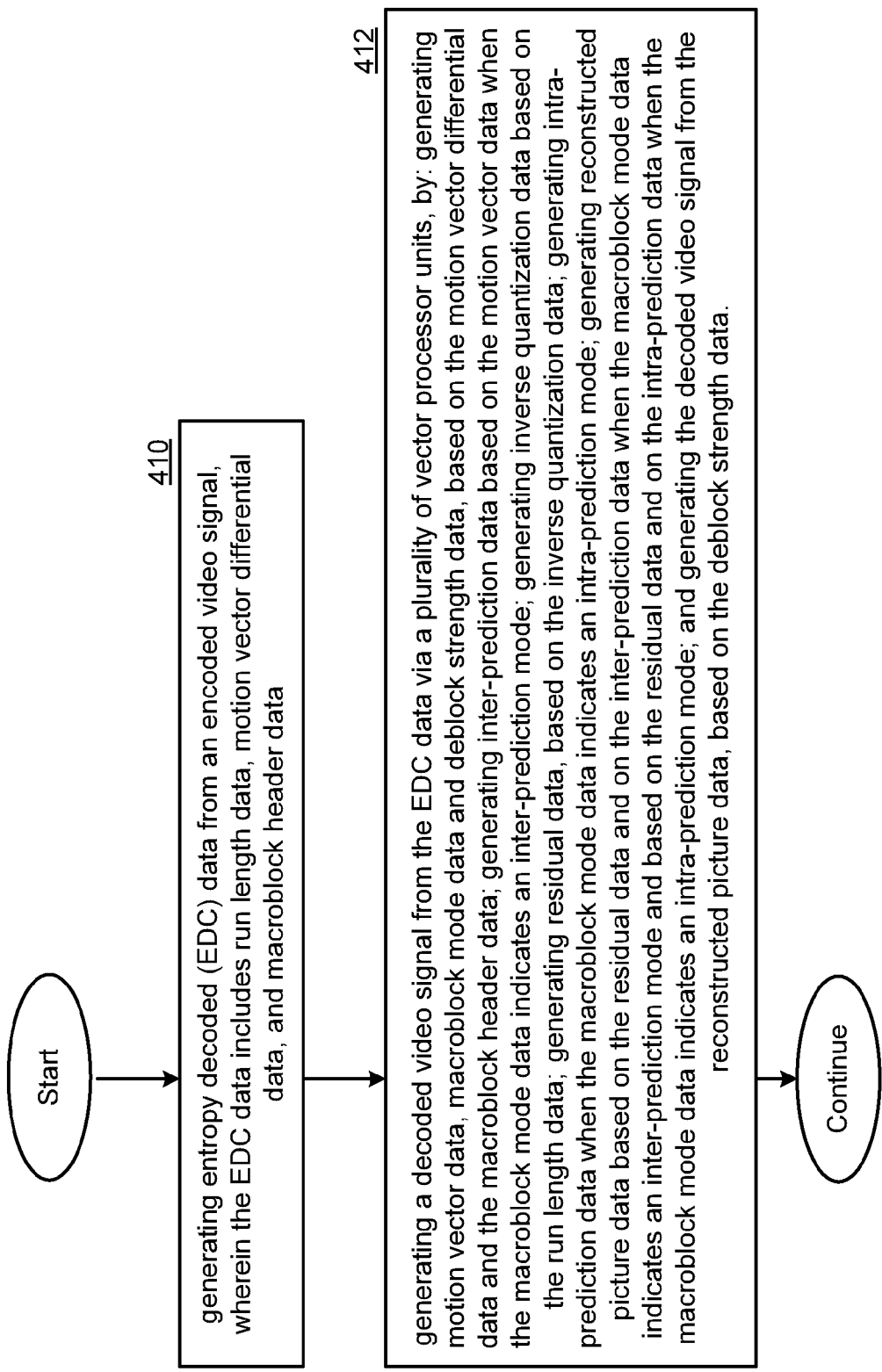
FIG. 15 presents a flow diagram representation of a method in accordance with an embodiment of the present invention.

FIG. 15 presents a block diagram representation of a method in accordance with an embodiment of the present invention. In particular, a method is presented for use in conjunction with one or more functions and features described in conjunction with FIGS. 1-10. In step 410, entropy decoded (EDC) data is generated from an encoded video signal, wherein the EDC data includes motion vector differential data and macroblock header data and run level data. In step 412, a decoded video signal is generated from the EDC data via a plurality of vector processor units, by:
(a) generating motion vector data, macroblock mode data and deblock strength data, based on the motion vector differential data and the macroblock header data;
(b) generating inter-prediction data based on the motion vector data when the macroblock mode data indicates an inter-prediction mode;
(c) generating inverse quantization data based on the run level data;
(d) generating residual data, based on the inverse quantization data;
(e) generating intra-prediction data when the macroblock mode data indicates an intra-prediction mode;
(f) generating reconstructed picture data based on the residual data and on the inter-prediction data when the macroblock mode data indicates an inter-prediction mode and based on the residual data and on the intra-prediction data when the macroblock mode data indicates an intra-prediction mode; and
(g) generating the decoded video signal from the reconstructed picture data, based on the deblock strength data.

In an embodiment of the present invention, the plurality of vector processors includes at least one matrix vector processor that parallel processes at least one matrix operation in conjunction with the generation of the inverse quantization data based on the run level data. The plurality of vector processors can further include at least one matrix vector processor that parallel processes at least one matrix operation in conjunction with the generation of the residual data based on the inverse quantization data; at least one filter vector processor that parallel processes at least one filter operation of the generation of the inter-prediction data based on the motion vector data; at least one filter vector processor that parallel processes at least one filter operation of the generation of the intra-prediction data based on the macroblock mode data; and/or at least one filter vector processor that parallel processes at least one filter operation of the generation of the decoded video signal from the reconstructed picture data.

Figure 16:
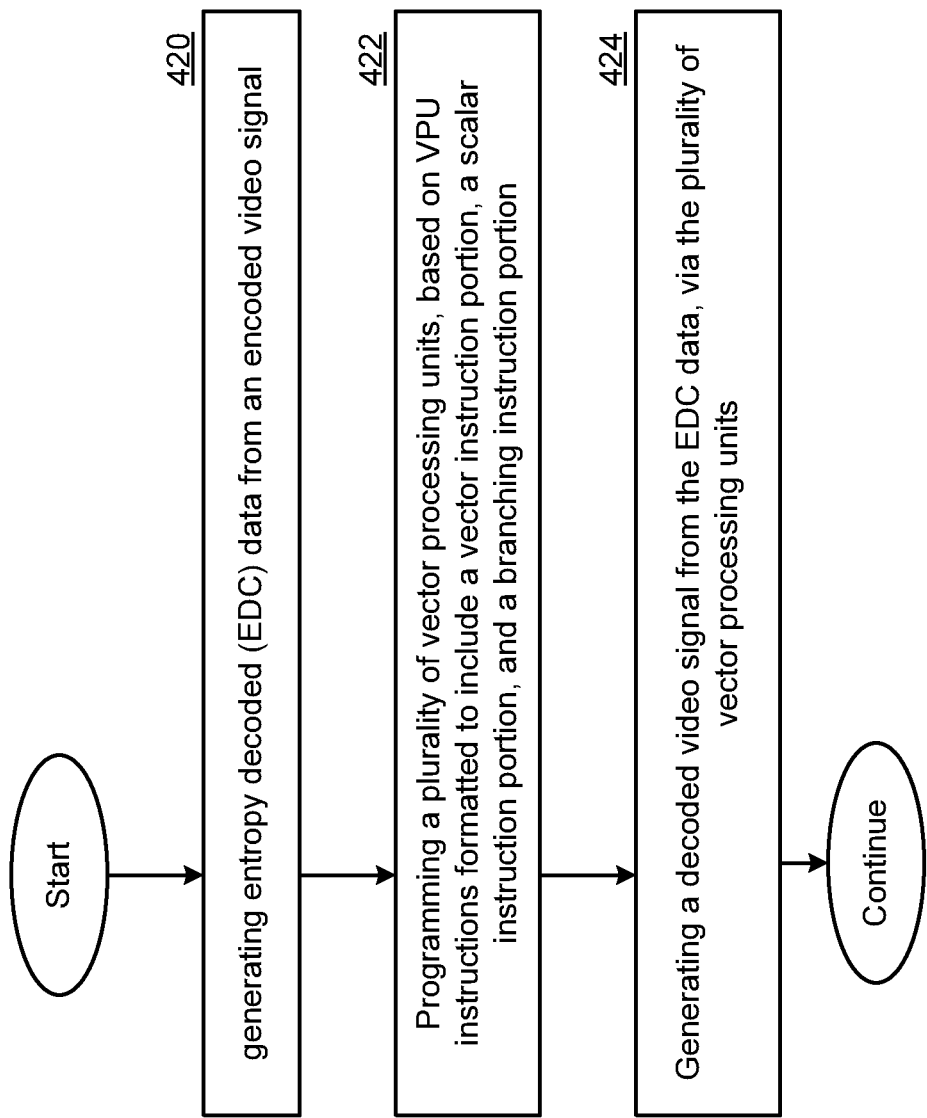
FIG. 16 presents a flow diagram representation of a method in accordance with an embodiment of the present invention.

FIG. 16 presents a block diagram representation of a method in accordance with an embodiment of the present invention. In particular, a method is presented for use in conjunction with one or more functions and features described in conjunction with FIGS. 1-9. In step 420, entropy decoded (EDC) data is generated from an encoded video signal. In step 422, a plurality of vector processor units are programmed based on VPU instructions formatted to include a vector instruction portion, a scalar instruction portion, and a branching instruction portion. In step 424, a decoded video signal is generated from the EDC data, via the plurality of vector processing units.

In an embodiment of the present invention, the step 422 includes configuring at least one matrix vector processor to parallel process at least one matrix operation, and wherein the vector instruction includes a matrix command and matrix data. Step 422 can also include configuring at least one filter vector processor to parallel process at least one filter operation, and wherein the vector instruction includes a filter command and filter data. The branching instruction can include an unconditional branching instruction or a conditional branching instruction. The scalar instruction can includes a data component, a scalar logical operation on the data component, and/or a scalar arithmetic operation on the data component.

Figure 17:
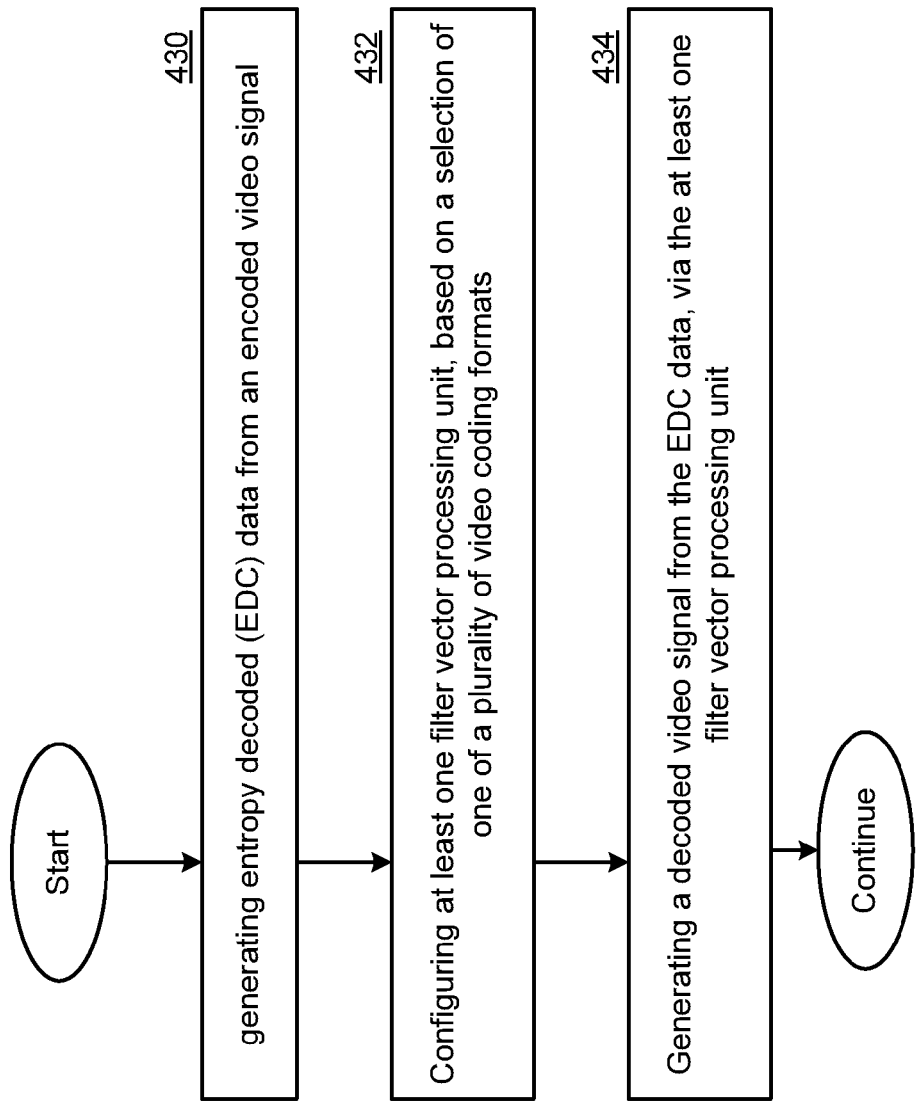
FIG. 17 presents a flow diagram representation of a method in accordance with an embodiment of the present invention.

FIG. 17 presents a block diagram representation of a method in accordance with an embodiment of the present invention. In particular, a method is presented for use in conjunction with one or more functions and features described in conjunction with FIGS. 1-9. In step 430, entropy decoded (EDC) data is generated from an encoded video signal. In step 432, at least one filter vector processing unit is configured based on a selection of one of a plurality of video coding formats. In step 434, a decoded video signal is generated from the EDC data, via the at least one filter vector processing unit.

Step 434 can include parallel processing picture data via the at least one filter vector processor in accordance with a vector instruction that includes a filter command and picture data, wherein the picture data includes a plurality of pixels. Step 434 can include implementing an n-tap one-dimensional vertical filter; implementing an n-tap one-dimensional horizontal filter; and/or implementing an n-tap two-dimensional filter.

While particular combinations of various functions and features of the present invention have been expressly described herein, other combinations of these features and functions are possible that are not limited by the particular examples disclosed herein are expressly incorporated in within the scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a video decoder. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A video decoder comprising:
   an entropy decoding device that generates entropy decoded (EDC) data from an encoded video signal;
   a multi-format video decoding device, coupled to the entropy decoding device, includes a plurality of vector processor units for generating a decoded video signal from the EDC data, wherein the plurality of vector processing units are programmed via VPU instructions formatted to include a vector instruction portion, a scalar instruction portion, and a branching instruction portion, and wherein the scalar instruction portion includes non-vector data and a non-vector processing command to be executed by the at least one of the plurality of vector processing units and wherein the non-vector processing command includes at least one of: a scalar logical operation on the non-vector data, and a scalar arithmetic operation on the non-vector data.

2. The video decoder of claim 1 wherein the plurality of vector processing units includes at least one matrix vector processor that parallel processes at least one matrix operation of the multi-format video decoding device, and wherein the vector instruction includes a matrix command and matrix data.

3. The video decoder of claim 1 wherein the plurality of vector processors includes at least one filter vector processor that parallel processes at least one filter operation of the multi-format video decoding device and wherein the vector instruction includes a filter command and filter data.

4. The video decoder of claim 1 wherein the branching instruction includes at least one of: an unconditional branching instruction, and a conditional branching instruction.

5. The video decoder of claim 1 wherein the non-vector processing command is executed in a single instruction of the at least one of the plurality of vector processing units.

6. The video decoder of claim 1 wherein the encoded video signal is encoded in accordance with a VP8 coding standard.

7. A method comprising:
   generating entropy decoded (EDC) data from an encoded video signal;
   programming a plurality of vector processor units, based on VPU instructions formatted to include a vector instruction portion, a scalar instruction portion, and a branching instruction portion, wherein the scalar instruction portion includes non-vector data and a non-vector processing command to be executed by the at least one of the plurality of vector processor units and wherein the non-vector processing command includes at least one of: a scalar logical operation on the non-vector data, and a scalar arithmetic operation on the non-vector data; and
   generating a decoded video signal from the EDC data, via the plurality of vector processing units.

8. The method of claim 7 wherein programming the plurality of vector processor units includes configuring at least one matrix vector processor to parallel process at least one matrix operation, and wherein the vector instruction includes a matrix command and matrix data.

9. The method of claim 7 wherein programming the plurality of vector processor units includes configuring at least one filter vector processor to parallel process at least one filter operation, and wherein the vector instruction includes a filter command and filter data.

10. The method of claim 7 wherein the branching instruction includes at least one of: an unconditional branching instruction, and a conditional branching instruction.

11. The method of claim 7 wherein the non-vector processing command is executed in a single instruction of the at least one of the plurality of vector processing units.

12. The method of claim 7 wherein the encoded video signal is encoded in accordance with a VP8 coding standard.

* * * * *